United States Patent [19]

Gordon

[11] Patent Number: 4,650,554

[45] Date of Patent: Mar. 17, 1987

[54] PHOTOELECTROLYSIS METHOD AND MEANS

[76] Inventor: Roy Gordon, 22 Highland St., Cambridge, Mass. 02138

[21] Appl. No.: 791,063

[22] Filed: Oct. 24, 1985

[51] Int. Cl.$^4$ .............................................. C25B 1/02
[52] U.S. Cl. .................................. 204/129; 204/157.5; 204/157.52; 422/186
[58] Field of Search ................. 204/129, 157.5, 157.52; 422/186

[56] References Cited

U.S. PATENT DOCUMENTS 4,466,869  8/1984  Ayers .............................. 204/157.52
4,511,450  4/1985  Neefe ................................. 204/157.5

Primary Examiner—R. L. Andrews
Attorney, Agent, or Firm—Cesari and McKenna

[57] ABSTRACT

An integrated photoelectrolytic apparatus for catalyzing the photodecomposition of a liquid electrolyte, such as water, into its gaseous decomposition products includes a photovoltaic section bonded mechanically and electrically to one surface of a porous electronically conductive barrier section which is arranged to inhibit the evolution of decomposition products at its pore surfaces. A catalyst for the electrolytic evolution of a decomposition product is applied to the opposite surface of said barrier section so that when the bonded-together sections are wetted by an electrolyte and light is incident on the photovoltaic section, one decomposition product evolves at the exposed surface of the photovoltaic section while another decomposition product evolves at the catalytic surface of the barrier section.

23 Claims, 3 Drawing Figures

PHOTOELECTROLYSIS METHOD AND MEANS

BACKGROUND OF THE INVENTION

This invention relates to improved method and apparatus for decomposing water and other liquids by photoelectrolysis. It relates more particularly to the solar production of hydrogen and oxygen gases from water.

Hydrogen gas may be produced from water and sunlight in different ways. Because hydrogen is a versatile, storable, transportable, clean, and non-polluting fuel, production of that gas from these renewable sources is very desirable. The same is true of oxygen to a lesser extent. However, none of the proposed solar methods of producing these gases has yet proven to be practical from a commercial standpoint.

The methods for solar water splitting may be divided roughly into two classes; namely thermal and photoelectrochemical. The thermal methods involve the use of concentrated sunlight to produce high temperature heat, which is then used to separate water into hydrogen and oxygen. One thermal method of which we are aware heats water vapor to dissociation at very high temperatures (E. Bilgen, Int. J. Hydrogen Energy, Vol. 9, p. 53, 1984). Another approach is to operate several endothermic chemical reactions cyclically with concentrated solar heat to split the water into its elements (T. Ohta and I. Abe, Int. J. Hydrogen Energy, Vol. 10, p. 275, 1985). Also, of course, solar heat can be used to generate steam to operate a conventional electric generator whose output then powers a separate water electrolysis cell. All of these thermal methods require expensive mirror and tracking systems to concentrate the sunlight.

The photoelectrochemical approach to solar water splitting, on the other hand, uses the sunlight to produce directly an electric current which then electrolyzes the water into its elements. One such method uses conventional photovoltaic cells that convert sunlight into electricity which is then used to electrolyze the water. Actually, several photovoltaic cells must be wired together in series to produce sufficient voltage for each electrolytic cell. This is because each photocell produces less than 1 volt, while each electrolytic cell usually operates at a voltage of about 2 volts so that an economical electrode area can be used in each electrolytic cell. Actually, commercial water electrolyzers usually connect many electrolytic cells in series in order to combine them efficiently in one high-pressure electrolyte compartment. Consequently, a large number of solar cells must be connected electrically in series by external circuitry in order to run these high-voltage electrolysis systems. If any one of these solar cells fails, or is shadowed from sunlight, the electrolytic action stops in the entire system and the production of hydrogen and oxygen stops entirely.

A second photoelectrochemical method places an illuminated semiconducting electrode in direct contact with an aqueous electrolyte solution. Light absorbed in the semiconductor causes direct reaction of the minority carriers in the semiconductor with the electrolyte at the surface of the semiconductor. Photo-anodes of n-$TiO_2$ release oxygen (A. Fujishima and K. Honda, Nature, Vol. 238, p. 37, 1972), while photocathodes of p-GaP (A.J. Nozik, Applied Physics Letters, Vol. 30, p. 567, 1977) and p-InP (E. Aharon-Shalom and A. Heller, J. Electrochem. Soc., Vol. 129, p. 2865, 1982), have been used to generate hydrogen gas. This type of photoelectrolyzer is disadvantaged because evolving hydrogen and oxygen gases tend to recombine thereby lowering the efficiency of the apparatus appreciably. Devices of this type are disadvantaged because they are quite difficult to make and/or they must be illuminated from both sides in order to operate properly.

SUMMARY OF THE INVENTION

It is an object of the present invention to provide an improved photoelectrolyzer that avoids the above-described disadvantages of the prior apparatus of this general type.

Another object of the invention is to provide improved solar water splitting apparatus.

Still another object of the invention is to provide such apparatus which does not require any external electric circuitry for its operation.

A further object of the invention is to provide photoeclectrolysis apparatus which prevents recombining of the gases evolved during the electrolytic process.

Another object is to provide such apparatus which may be deployed easily to collect a large amount of solar energy.

A further object of the invention is to provide an improved method of splitting water and other liquids by photoelectrolysis.

Other objects will in part be obvious and will, in part, appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

Briefly, my invention as applied to a solar water splitter comprises a single cell of indeterminate area composed of an upper photovoltaic section bonded to a coextensive lower barrier section. The cell is positioned in an enclosure or housing containing aqueous electrolyte so as to divide the housing into an upper compartment and a lower compartment, with the cell constituting a dividing wall between the two compartments. When the photovoltaic section is illuminated by sunlight shining through a transparent window in the housing, hydrogen gas evolves from one exposed surface of the cell into the adjacent compartment, while oxygen gas evolves from the opposite exposed surface of the cell into the other housing compartment, the two gases being kept separate from one another by the cell's barrier section. That section is composed of a substantially solid, but porous, electrically conductive body which does not allow current flow to the electrolyte solution within its pores so that oxygen gas is evolved only at its exposed surface corresponding to a surface of the cell as a whole. The two gases that are generated by the photoelectrolysis process are conducted out of the housing by fluid conduits leading from the two compartments.

The photoelectrolysis apparatus can be constructed as a rigid article in the nature of a panel for placement on the roof of a building or other structure. Alternatively, the cell may be encapsulated in a flexible container so that it forms a mat which can be rolled out on the ground or other surface and filled with electrolyte to produce hydrogen and oxygen at any location where there is incident sunlight.

BRIEF DESCRIPTION OF THE DRAWING

For a fuller understanding of the nature and objects of the invention, reference should be should be made to the following detailed description taken in connection with the accompanying drawing, in which.

DETAILED DESCRIPTION OF THE PREFERRED EMBODIMENTS

Figure 1:
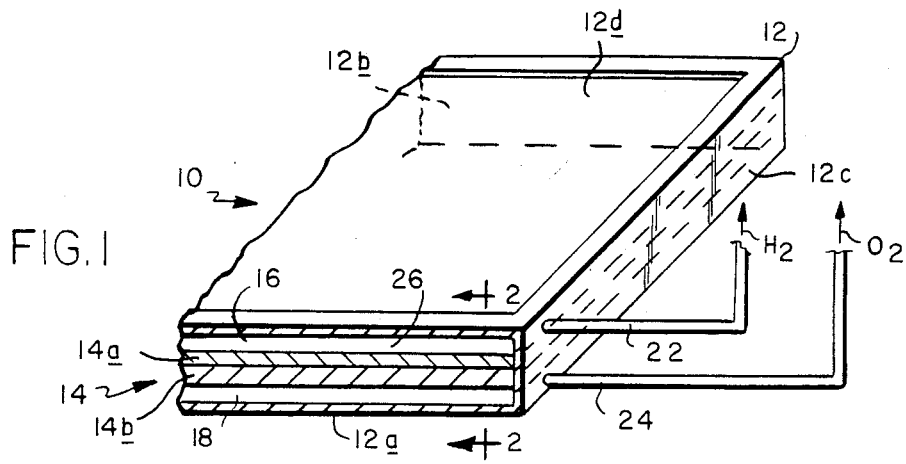
FIG. 1 is a fragmentary sectional view of photoelectrolysis apparatus incorporating my invention.

Referring to FIG. 1 of the drawing, photoelectrolysis apparatus made in accordance with this invention is indicated generally at 10. It includes a box-like housing 12 having a bottom wall 12a, a pair of side walls 12b, a pair of end walls 12c, and a top wall 12d, at least the last being substantially transparent to sunlight. The housing 12 may have any selected length and width. For example, it may have the dimensions of a conventional solar panel.

Positioned inside housing 12 is a photoelectrolysis cell shown generally at 14. This cell is in the form of a flat slab or panel which is supported horizontally inside housing 12 midway along the housing height or thickness so as to define a housing compartment or chamber 16 located above the cell and a housing compartment or chamber 18 located between the cell and the housing bottom wall 12a. As best seen in FIG. 1, a first fluid conduit 22 extends through a housing end wall 12c to compartment 16 and a second similar conduit 24 leads through housing end wall 12c to compartment 18.

In use, housing 12 is filled with an aqueous electrolyte 26 such as sulfuric acid. This liquid may be introduced into the housing, for example, through conduits 22 and 24 or openings in the housing walls. When cell 14 is immersed in that electrolyte and illuminated, hydrogen evolves at the surface of cell 14 in compartment 16 as indicated by the small bubbles $H_2$ in FIG. 2. This gas accumulates in compartment 16 and is conducted therefrom by conduit 22 leading upward to prevent the electrolyte from draining from the housing. At the same time, oxygen gas evolves at the undersurface of cell 14 in housing compartment 18 as indicated by the small bubbles $O_2$ present at that location. The oxygen accumulating in compartment 18 finds its way to conduit 24 and is conducted upward from the housing. Preferably, apparatus 10 is tilted somewhat to elevate the conduit-containing end of the housing so that the evolved gases tend to collect there to facilitate their removal from the housing.

Figure 2:
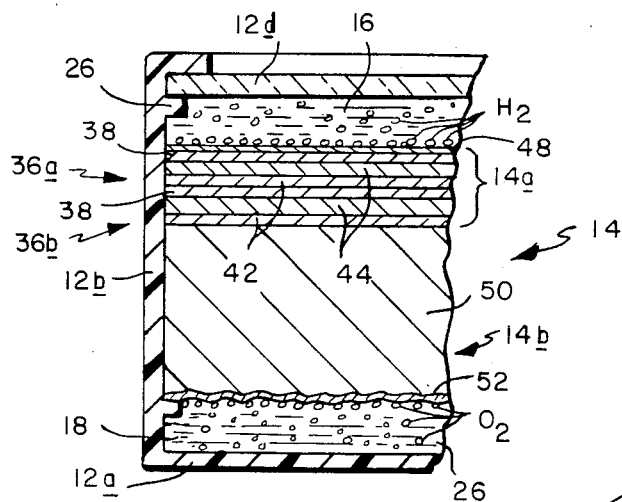
FIG. 2 is a fragmentary sectional view on a much larger scale taken along line 2—2 of FIG. 1.

Refer now to FIG. 2 of the drawing which shows the construction of the electrolysis cell 14 in greater detail. As seen there, the cell section 14a is composed of one or more photovoltaic or solar cells, the illustrated apparatus having two such cells shown generally at 36a and 36b. The number of solar cells is such that the total voltage generated by the cells is sufficient to electrolyze water. The theoretical minimum voltage required to do this is about 1.23 volts, but in actual practice, a voltage of about 1.5 to 2 volts is required for the generation of hydrogen with a normal solar input. Thus, the cells 36a and 36b may comprise, for example, two conventional, thin, amorphous silicon solar cells bonded together one on top of the other as a so-called tandem set of cells so that they are connected electrically in series, supplying in excess of 1.5 volts. Various other materials for thin film tandem solar cells are known, including hydrogenated amorphous silicon alloys with germanium, carbon, nitrogen, and fluorine.

Each photovoltaic cell 36a and 36b includes an n-doped layer 38 which faces the hydrogen evolving surface of the cell 14, i.e., upwards in FIG. 2, and a p-doped layer 42 which faces toward the oxygen evolving cell 14 surface, i.e., downwards in FIG. 2. As noted above, the cells 36a and 36b are of the amorphous silicon type. Therefore, each includes a non-doped layer 44 between the doped layers 38 and 42 in order to increase the efficiency of the cell. If these cells were composed of crystaline silicon, the non-doped layer 44 could be omitted without any appreciable loss of efficiency.

It should be mentioned at this point, that conventional thin film photovoltaic or solar cells include a solid layer of a transparent, electrically conductive material such as fluorine-doped tin oxide or tin-doped indium oxide on the face of the cell that is illuminated by the sun in order to conduct the electrical charges produced by the cell transversely to a wire leading from the cell. Such layers are not required in the cells 36a and 36b of apparatus 10 because their function is performed by the aqueous electrolyte 26. Moreover, any such tin oxide or indium oxide layer at the exposed surface of cell 36a would be disolved rapidly in the electrolyte during hydrogen evolution. The fact that such conductors are not required at the surfaces of cells 36a and 36b simplifies the manufacture of those cells and thus reduces the overall cost of the present apparatus. Preferably, however, a very thin, transparent platinum film 48 is deposited on the exposed surface of the photovoltaic section 14a not as a transverse conductor, R16-002 but to function as a catalyst to encourage the evolution of hydrogen gas at that surface. The platinum film also protects the silicon surface from oxidation by the electrolyte. The apparatus will operate without that film, but at a reduced efficiency and lifetime.

It is important to note that since the electrolyte 26 serves as the photocells' charge conductor as just discussed, section 14a should be porous so that electrolyte penetrates across the cells 36a and 36b over substantially their entire common areas. If section 14a were not porous, the electrical circuit through the electrolyte would have to be provided less desirably by conduction extending around the edges of section 14a.

Still referring to FIG. 2, the barrier section 14b of the electrolysis cell 14 is composed of a solid, but porous, electrically conductive material 50 such as a valve metal or metallic compound. When section 14b is immersed in the electrolyte 26, the electrolyte fills those pores. It should be mentioned that porous conductive electrodes, including those made of valve metals, have been used before in connection with electrolysis. European application EP No. 0013572 discloses an electrolytic cell incorporating such a porous electrode for oxygen ionization. The electrode is impregnated with an oxygen evolution catalyst, e.g. platinum, and immersed in an aqueous electrolyte. The presence of the pores greatly increases the catalytic surface area of the electrode wetted by the electrolyte at which electrolytic action occurs, thus maximizing the ionization of oxygen. In other words, current flow between electrode and electrolyte and the electrochemical reaction occur throughout the electrode. In applicant's cell, on the other hand, the porous barrier section 14b does not allow, at least at the small operating voltage of the cell 14, any electric current flow to the electrolyte solution within its pores. In the illustrated cell, this is because the selected barrier section material has a high over potential for oxygen. In another embodiment, it is because the pore surfaces or walls are provided with an insulating coating, e.g., by oxidation. In either event, no decomposition of the electrolyte ocurs within the barrier section 14b. Thus, that section functions as a membrane more or less. On the other hand, the lower surface of section 14b facing housing compartment 18 carries a coating 52 of an oxygen evolution catalyst such as ruthenium oxide ($RuO_2$) which has a low over-potential for oxygen in an electrolytic cell. Resultantly, oxygen gas is evolved only at the lower catalytic surface of section 14b and not within the section itself. Furthermore, during the operation of apparatus 10, the small size of the barrier section pores and surface tension prevent the oxygen gas generated at the under surface of section 14b from percolating up through cell 14 into the housing compartment 16 and mixing with the hydrogen gas accumulating therein. Therefore, the volumes of hydrogen and oxygen gases produced by the apparatus are kept completely isolated within the housing 12.

The electronic conductivity of the solid metallic structure of section 14b is necessary to transmit the electric current generated by the photovoltaic section 14a all the way to the coated lower surface of section 14b. The use of such a conductive membrane in apparatus 10 is in sharp contrast to conventional electrolysis cells which employ only insulating solids such as asbestos cloth to form the structure between the cell electrodes.

Suitable valve metals for the construction of the electrically conductive barrier section 14b include titanium, zirconium, vanadium, hafnium, niobium, tantalum, tungsten and their alloys. The metals can be in the form of sintered porous plates or closely woven wire cloth. Metals in these forms are commonly available as filters. Suitable metallic compounds of the valve metals include nitrides, carbides, and borides of the valve metals, such as titanium nitride (TiN), titanium carbide (TiC), and titanium boride ($TiB_2$). Also suitable is electrically conductive titanium oxide which has been reduced ($TiO_{2-x}$) and/or doped with elements such as niobium, tantalum, tungsten, or fluorine, to increase its electrical conductivity. These materials can be produced in the form of porous ceramic plates using well known processes. Although these metallic compounds are not available in the form of fibers or wires, they may be vapor-deposited on the surfaces of fibers to form an electrically conductive porous structure suitable for use as cell section 14b as will be described later in connection with FIG. 3.

While ruthenium oxide ($RuO_2$) is the prefered coating 52 catalyst for evolving oxygen at the lower surface of section 14b, that material may be combined with cocatalysts such as rhodium oxide ($RhO_2$), iridium oxide ($IrO_2$) and/or manganese oxide ($MnO_2$) and with binding agents such as titanium oxide ($TiO_2$), zirconium oxide ($ZrO_2$) or tantalum oxide ($Ta_2O_5$). These catalysts are known in the art and their preparations and properties are described in detail in U.S. Pat. Nos. 3,632,498; 3,711,385; 3,616,445 and 3,948,751, among others.

Hydrogen promoting catalysts for the light transparent coating 28 at the upper surface of the photovoltaic section 14a include, in addition to platinum, iridium, osmium, palladium, rhodium, and ruthenium. Platinum is generally prefered in acid electrolytes, although iridium is more durable. In alkaline electrolytes, base metals such as nickel, cobalt, and iron, may be used as hydrogen evolution catalysts.

For aqueous electrolytes 26, non-oxidizing acids are preferred, such as sulfuric acid ($H_2SO_4$) and perchloric acid ($HClO_4$). Alkaline electrolytes, such as potassium hydroxide (KOH) solutions, allow the use of less expensive catalysts, but alkaline electrolytes tend to degrade silicon-based photovoltaic layers. Salt electrolytes, such as sodium sulphate ($Na_2SO_4$) are the least prefered electrolytes, since they require the expensive noble-metal catalysts; they also tend to slowly degrade the quality of the photovoltaic materials.

As noted previously, the catalytic coating or film 48 on the upper surface of the photovoltaic section 14a must be transparent to sunlight. To permit wide flexibility in the selection of that catalyst, it may be desirable to reverse the surfaces of the electrolysis cell 14 that produce the hydrogen and oxygen gases. In other words, it may be desirable in some cases to apply the oxygen evolution catalyst to the upper, illuminated surface of cell 14 and the hydrogen evolution catalyst to the lower, dark surface thereof. In that event, the order of the layers in the photovoltaic cells 36a and 36b would be reversed so that the n-type (negative) layers face downward toward section 14b and the p-type (positive) layers face upward toward the housing compartment 16.

Figure 3:
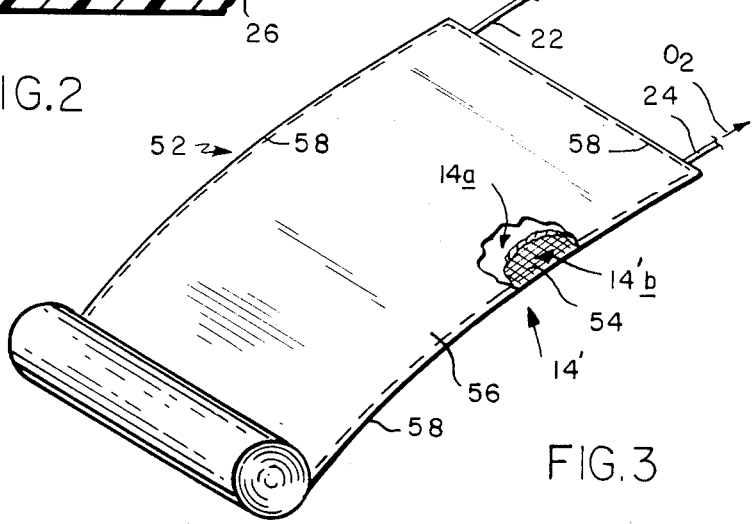
FIG. 3 is an isometric view on a small scale, with parts broken away, illustrating another embodiment of the invention.

FIG. 3 shows an apparatus embodiment 52 in the form of a flexible mat which can be transported and stored in a space-saving, rolled-up condition and unrolled on the ground or other horizontal surface when in use. Apparatus 52 is similar to apparatus 10 described above both structurally and operationally and accordingly carries many of the same identifying numerals. It differs in that its barrier section 14'b includes a nitride-coated fiberglass cloth sheet 54 instead of the porous rigid plate comprising apparatus 10. The photovoltaic section 14a described above is bonded to the upper surface of sheet 54 and the undersurface of sheet 54 carries an oxygen-evolving catalyst coating 52 similar to the one in the apparatus 10 to form an electrolysis cell shown generally at 14'. Cell 14' is placed between the plies of a lengthwise-folded, light transmitting plastic film or sheet 56. Then the free edges of those plies are sealed together at opposite faces of the cell edges as shown at 58 to form a fluid-tight, light transmitting bag-like enclosure for the cell 14', with the cell dividing the enclosure into upper and lower compartments. A conduit 22 connects to the upper compartment in apparatus 52 while conduit 24 leads from the lower compartment thereof. When the apparatus is deployed on the ground with its photovoltaic layer 14a facing the sun, hydrogen gas issues from conduit 22 and oxygen gas flows from conduit 24. As noted above, this apparatus embodiment is advantaged because it can be rolled up into a compact package when being transported or when not in use. Also, it is very easy to deploy on any more or less horizontal surface, even when the apparatus has a very large working area.

The invention is illustrated by the following specific examples:

EXAMPLE 1

A sintered ceramic plate of titanium nitride for use as section 14b was first coated with an oxygen-evolution catalyst by dissolving hydrated ruthenium trichloride in dilute (4:1) hydrochloric acid, and then evaporating the solution almost to dryness. The residue, constituting a more or less soluble form of ruthenium chloride, was mixed with a small amount of isopropanol and a small amount of polyvinyl alcohol was added as a thickening agent to prevent the catalyst from soaking into the ceramic plate. This mixture was then painted onto one surface of the ceramic plate. The layer was then dried in an oven at 50° C., and then fired in air in an oven maintained at 400° C. to form the coating 52.

The other (upper) surface of the titanium nitride plate was sanded lightly to remove any oxides or other contamination. Then it was dusted lightly with magnesium oxide powder, which, at a later step in the formation process, produced the required pore structure in the photovoltaic section 14a to be formed on the plate. Next, a conventional glow discharge apparatus was used to deposit hydrogenated amorphous silicon layers on the magnesium oxide-coated surface of the plate in the following sequence to form the two cells 36a and 36b of the photovoltaic section 14a:

1. boron-doped layer, 200 Å thick
2. non-doped layer, 4000 Å thick
3. phosporous-doped layer, 100 Å thick
4. boron-doped layer, 100 Å thick
5. non-doped layer, 1500 Å thick
6. phosphorous-doped layer, 100 Å thick Finally, a platinum film about 10 Å thick was deposited on top of the silicon layers.

The plate, coated thusly, was next placed in a 1 normal sulfuric acid solution. The acid dissolved the magnesium oxide powder particles, thereby opening up pores through the tandem photovoltaic cell section to permit aqueous electrolyte to penetrate through that section, thereby completing the electrolysis cell.

When that cell was wetted with sulfuric acid and placed in sunlight so that the light was incident on the platinum-coated surface of the cell, hydrogen bubbled from that surface and oxygen bubbled from the opposite, ruthenium oxide-coated surface.

EXAMPLE 2

A section of fiberglass cloth was coated with titanium nitride by chemical reaction from the vapor phase. Then the steps of Example 1 were repeated with the coated cloth substituting for the titanium nitride ceramic plate in that example. Next, coextensive sheets of transparent plastic film were placed against the upper and lower surfaces of that cell and secured together around their edges to form a lightweight, flexible, mat-like structure. When that structure was spread out on a flat surface in sunlight and filled with sulfuric acid, hydrogen gas evolved at the upper surface of the cell and oxygen gas was produced at the lower surface thereof.

It will be seen from the foregoing that my photoelectrolysis apparatus is quite effective for providing hydrogen and/or oxygen gases from water and sunlight. The apparatus is quite compact and may even be made as a flexible mat. Further, the apparatus is a unitary structure that does not require any external circuitry whatsoever in order to operate properly. Nor does the photovoltaic section of the apparatus require a coextensive transparent conductor of the type found on conventional solar cells. Therefore, it is not subject to failure due to a pinhole or other small defect in its light-absorbing semiconductor layers. Finally, the barrier section of the apparatus results in the generation of the hydrogen and oxygen gases at completely separate locations in the apparatus, with the barrier section preventing recombination of those gases. Therefore, the apparatus produces efficiently two separate, substantially pure hydrogen and oxygen gas streams.

It can thus be seen that the objects set forth above, among those made apparent from the preceding description, are efficiently attained. Also, it should be understood that certain changes may be made carrying out the above method and in the construction set forth without departing from the scope of the invention. For example, the same technique and apparatus may be used for the decomposition of other liquid electolytes by proper selection of the evolution catalysts applied to the upper and lower surfaces of the electrolysis cell 14. For example a hydrogen bromide (HBr) or hydrogen chloride (HCl) electrolyte may be decomposed using the same gas evolution catalysts described above on the upper and lower surfaces of the cell 14 to generate hydrogen and bromine gases or hydrogen and chlorine. Therefore, it is intended that all matter described herein and illustrated in the drawing shall be interpreted as illustrative and not in a limiting sense.

What is claimed as new and desired to be secured by Letters Patent of the United States is:

1. A photoelectrolysis method for decomposing a liquid electrolyte into a plurality of decomposition products, said method comprising the steps of
   A. forming a porous layer of an electronically conductive material having a relatively high overpotential for said decomposition products in an electrolytic cell;
   B. laminating a sheet-like porous photovoltaic unit having a total output voltage sufficient to electrolyze said electrolyte on one surface of said layer so that the two are connected together both mechanically and electrically as a panel;
   C. coating the opposite surface of said layer with a catalyst having a relatively low overpotential for one of said decomposition products in an electrolytic cell;
   D. immersing said panel in said liquid electrolyte; and
   E. illuminating said photovoltaic unit with light energy whereby said one of said decomposition products evolves at the coated surface of said layer and another decomposition product evolves at the illuminated surface of said photovoltaic unit, with the panel being a barrier that isolates said evolving products from one another.

2. The method defined in claim 1 and including the additional step of applying to the illuminated surface of said photovoltaic unit a thin transparent coat of a material that catalyzes said another decomposition product.

3. The method defined in claim 1 and including the additional steps of
   A. encapsulating said panel and electrolyte in an enclosure so that the panel divides the enclosure into two compartments, and
   B. conducting a said decomposition product from at least one of said compartments.

4. Integrated photoelectrolysis apparatus for catalyzing the photodecomposition of water into separate gas streams of hydrogen and oxygen, comprising:
   A. a porous electronically conductive barrier section having opposite surfaces;

B. a plural layer photovoltaic section bonded mechanically and electrically to one surface of said barrier section;
C. a catalyst on the opposite surface of said barrier section to promote the electrolytic evolution of one of said hydrogen and oxygen gases;
D. an aqueous electrolyte permeating said barrier section; and
E. inhibiting means in said barrier section for inhibiting the evolution and presence of said gases in the pores of said barrier section when said photovoltaic section is exposed to light,
whereby said one of said gases evolves only at said opposite catalytic surface of said barrier section, and
the other of said gases evolves only at the surface of said photovoltaic section.

5. The apparatus defined in claim 4 wherein said inhibiting means comprise insulating means on the surfaces of said barrier section pores for electrically insulating said barrier section from said electrolyte.

6. The apparatus defined in claim 4 wherein said inhibiting means comprise means for providing a higher over-potential for the evolution of said one of said gases at the interior surfaces of said barrier section pores than at said opposite catalytic surface of the barrier section.

7. The apparatus defined in claim 4 wherein said photovoltaic section is also porous and permeated with said electrolyte.

8. The apparatus defined in claim 4 wherein:
A. said one of said gases is oxygen; and
B. said catalyst comprises ruthenium oxide.

9. The apparatus defined in claim 4 wherein:
A. said one of said gases is hydrogen; and
B. said catalyst is selected from the group consisting of platinum, palladium, iridium, osmium, rhodium, ruthenium, and their alloys.

10. The apparatus defined in claim 4 and further including a transparent catalyst coating on the exposed surface of said photovoltaic layer to promote the electrolytic evolution of the other of said gases.

11. The apparatus defined in claim 10 wherein:
A. said one of said gases is oxygen; and
B. said transparent catalyst coating is selected from the group consisting of platinum, iridium, osmium, palladium, rhodium, ruthenium and their alloys.

12. The apparatus defined in claim 10 wherein:
A. said one of said gases is hydrogen; and
B. said transparent catalyst coating comprises ruthenium oxide.

13. The apparatus defined in claim 4 wherein said barrier section comprises a material selected from the group consisting of a valve metal and a nitride, carbide and boride of a valve metal.

14. The apparatus defined in claim 13 wherein said barrier section comprises titanium nitride.

15. The apparatus defined in claim 14 wherein said electrolyte comprises sulfuric acid or perchloric acid.

16. The apparatus defined in claim 4 and further including:
A. a fluid-tight walled container for said sections, said container walls and said sections defining
a first chamber in said container adjacent said photovoltaic section, and
a second chamber in said container adjacent said barrier section;
B. means for conducting fluid out of said first chamber;
C. means for conducting fluid out of said second chamber; and
D. means defining a light-transmitting area in the wall of said container opposite said photovoltaic section.

17. The apparatus defined in claim 16 wherein said sections and said container are flexible so that the apparatus can be rolled up into a compact package.

18. The apparatus defined in claim 17 wherein said barrier section comprises
A. a sheet of fiberglass cloth; and
B. a material selected from the group consisting of a valve metal and a nitride, carbide and boride of a valve metal coated on said cloth.

19. Photoelectrolysis apparatus for decomposing a liquid electrolyte into a plurality of separate streams of decomposition products comprising
A. a generally fluid-tight enclosure;
B. a sheet-like, porous, electronically conductive barrier layer having opposite surfaces;
C. a sheet-like, porous, plural-layer photovoltaic section bonded mechanically and electrically to one surface of said barrier layer;
D. a catalyst coating on the opposite surface of said barrier layer to promote the electrolytic evolution of one of said products at said opposite surface, said layer, section and coating forming a unitary laminated panel;
E. means for mounting said panel in said enclosure so as to divide said enclosure into a first chamber contiguous to said photovoltaic section and a second chamber contiguous to said opposite coated surface of said barrier layer;
F. means for introducing a liquid electrolyte into said enclosure so that it permeates said layer and section;
G. means for preventing current flow from said barrier layer to the electrolyte in the pores of said barrier layer; and
H. means for exposing said photovoltaic section to light whereby
said one of said products evolves only in said second chamber, and
the other of said products evolves only in said first chamber; and
I. conduit means attached to said enclosure for conducting fluid from at least one of said chambers.

20. The apparatus defined in claim 19 wherein said preventing means comprise insulating means on the surfaces of said barrier section pores for electrically insulating said barrier section from said electrolyte.

21. The apparatus defined in claim 19 wherein said preventing means comprise means for providing a higher over-potential for the evolution of said one of said products at the surfaces of said barrier layer pores than at said opposite coated surface of the barrier layer.

22. The apparatus defined in claim 19 wherein said laminated structure and enclosure are flexible.

23. The apparatus defined in claim 19 and further including a second catalyst coating on the exposed surface of said photovoltaic section, said second coating being
A. transparent, and
B. promoting the evolution of said another decomposition product.

* * * * *